(12) United States Patent
Stein

(10) Patent No.: US 7,738,236 B2
(45) Date of Patent: Jun. 15, 2010

(54) LIGHT WEIGHT SYSTEM FOR LIGHTNING PROTECTION OF NONCONDUCTIVE AIRCRAFT PANELS

(75) Inventor: Raymond J. Stein, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 677 days.

(21) Appl. No.: 11/622,850

(22) Filed: Jan. 12, 2007

(65) Prior Publication Data
US 2008/0170349 A1    Jul. 17, 2008

(51) Int. Cl.
*H05F 3/00*   (2006.01)
*H02H 1/00*   (2006.01)
*H02H 1/04*   (2006.01)
*H02H 3/22*   (2006.01)
*H02H 9/06*   (2006.01)
*H02H 3/00*   (2006.01)
*H01H 47/00*  (2006.01)
*H05F 3/02*   (2006.01)

(52) U.S. Cl. ............... 361/218; 361/117; 361/212; 361/220

(58) Field of Classification Search ........... 361/218
See application file for complete search history.

(56) References Cited

U.S. PATENT DOCUMENTS

| | | | | |
|---|---|---|---|---|
| 3,755,713 A | * | 8/1973 | Paszkowski | 361/218 |
| 3,906,308 A | * | 9/1975 | Amason et al. | 361/218 |
| 3,989,984 A | * | 11/1976 | Amason et al. | 361/212 |
| 4,755,904 A | * | 7/1988 | Brick | 361/117 |
| 5,175,665 A | * | 12/1992 | Pegg | 361/218 |
| 5,845,872 A | * | 12/1998 | Pridham et al. | 244/1 A |
| 7,093,787 B2 | * | 8/2006 | Garrettson et al. | 244/1 A |
| 7,236,343 B2 | * | 6/2007 | Heidlebaugh et al. | 361/218 |
| 7,307,825 B2 | * | 12/2007 | De La Fuente De Ana et al. | 361/212 |
| 2007/0177330 A1 | * | 8/2007 | Ackerman et al. | 361/220 |
| 2008/0137259 A1 | * | 6/2008 | Heeter et al. | 361/218 |

\* cited by examiner

*Primary Examiner*—Stephen W Jackson
*Assistant Examiner*—Dharti H Patel
(74) *Attorney, Agent, or Firm*—Yee & Associates, P.C.; Eric K. Satermo

(57) ABSTRACT

A system for lightning-protection of an aircraft skin panel that includes a nonconductive skin panel substrate and a series of spaced apart electrically conductive strips embedded in and extending along an outer surface of the nonconductive skin panel substrate. A series of electrically conductive fasteners extend through the nonconductive skin panel substrate to affix it to the airframe of the aircraft. The fasteners are arrayed along peripheral regions of the nonconductive skin panel substrate. Each of the electrically conductive strips is in electrical communication with the aircraft airframe through at least one fastener located proximate each end region of each strip.

20 Claims, 3 Drawing Sheets

FIG.1 *(PRIOR ART)*

LIGHT WEIGHT SYSTEM FOR LIGHTNING PROTECTION OF NONCONDUCTIVE AIRCRAFT PANELS

TECHNICAL FIELD

The present disclosure relates generally to lightning protection for aircraft exterior panels. More particularly, the present disclosure relates to a lighter weight system for lightning protection of non-electrically conductive aircraft exterior panels.

BACKGROUND

It is generally known that areas on an aircraft in flight are subject to direct lightning strike attachment. For an aircraft that has metallic exterior skin, which is made up of electrically conductive metal panels, this poses insignificant hazard. When lightning attaches to a conductive skin, the charge is usually conducted through the skin, the underlying aircraft structure and to a grounding system, via fasteners and other skin-to-structure connections, with negligible damage to the skin. However, when the aircraft skin is not electrically conductive, lightning strikes may cause significant damage including puncture of the skin. A non-electrically conductive skin cannot dissipate the electrical energy of the lightning strike and this localization of the energy may cause physical damage, such as possible puncture of the skin. Such a puncture raises a potential risk of lightning attachment to underlying aircraft systems. Such attachment may be very hazardous, depending upon which underlying system is affected.

One solution to the issue of lightning damage to nonconductive aircraft panels is to completely cover the outer surface area of each panel 10 that is vulnerable to lightning attachment with a conductive metal liner 12, as shown in FIG. 1. The panel 10 is attached to the aircraft underlying structure 15 via a series of metal fasteners 18 that are in electrical contact with the metal liner 12. Accordingly, electrical energy from the lightning strike 20 onto panel 10 is dissipated across the metal liner 12 to fasteners 18 and thence to the aircraft structure 15, as shown by arrows in FIG. 1. In order to reduce weight, the metal liner 12 may be of an expanded aluminum or other alloy. Nonetheless the use of a metal liner on each panel vulnerable to lightning strikes adds weight to the aircraft design and reduces aircraft payload.

Accordingly, there is a need for a lighter-weight lightning protection system as an alternative to the use of electrically-conductive metal liners that completely cover the entire outer surfaces of panels of aircraft that has a skin of nonconductive panels. Other desirable features and characteristics of the present invention will become apparent from the subsequent detailed description and the appended claims, taken in conjunction with the accompanying drawings and the foregoing technical field and background.

BRIEF SUMMARY

Embodiments provide a lighter-weight lightning protection system for nonconductive aircraft skin panels that are prone to lightning attachment.

In one example embodiment, a lightning-protection system for an aircraft skin panel that has: a nonconductive skin panel; and a lightning attracting and dissipating array that is deployed at only a portion of the outer surface of the nonconductive skin panel. In addition, an electrical conductor permits electrical communication between the lightning attracting and dissipating array and the airframe of the aircraft.

In another embodiment the lightning-protection system is for an aircraft skin panel that is made of nonconductive material. The system includes a series of electrically conductive fasteners extending through the nonconductive skin panel to affix the nonconductive skin panel to aircraft structure. The system uses electrically conductive strips which are spaced apart to form an array. These strips are embedded in and extend along an outer surface of the nonconductive skin panel material. Each of the spaced apart electrically conductive strips is in electrical communication with the aircraft structure through at least one fastener located proximate each end region of each strip.

BRIEF DESCRIPTION OF THE DRAWINGS

A more complete understanding of the present technology may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

An exemplary embodiment provides a lightning-protection system that includes an aircraft skin panel that has an underlying nonconductive skin substrate panel. A lightning diverting and dissipating system deployed at, or embedded in, the skin panel surface provides lightning protection. The lightning diverting and dissipating array includes a plurality of electrically conductive surface layers that are spaced apart and deployed on only a portion of the outer surface of the nonconductive skin panel, and an electrical conductor connecting each of the electrically conductive surface layers to structure of the aircraft. Thus, lightning is attracted preferentially to the electrically conductive surface layer and energy from the lightning strike will be diverted to the aircraft structure via the electrical conductor, which may be a metal fastener, for example, that affixes the skin panel to the airframe. The electrically conductive surface layers do not cover the entire outer surface of the nonconductive skin panel, but only a relatively small portion thereof. Accordingly, the embodiment provides significant weight reduction while providing substantially the same lightning protection as a full outer metal liner.

In the specification and claims, a nonconductive aircraft skin panel is one that is prone to greater physical damage from a lightning strike due its inability to conduct the lightning energy into the aircraft structure.

Figure 1:
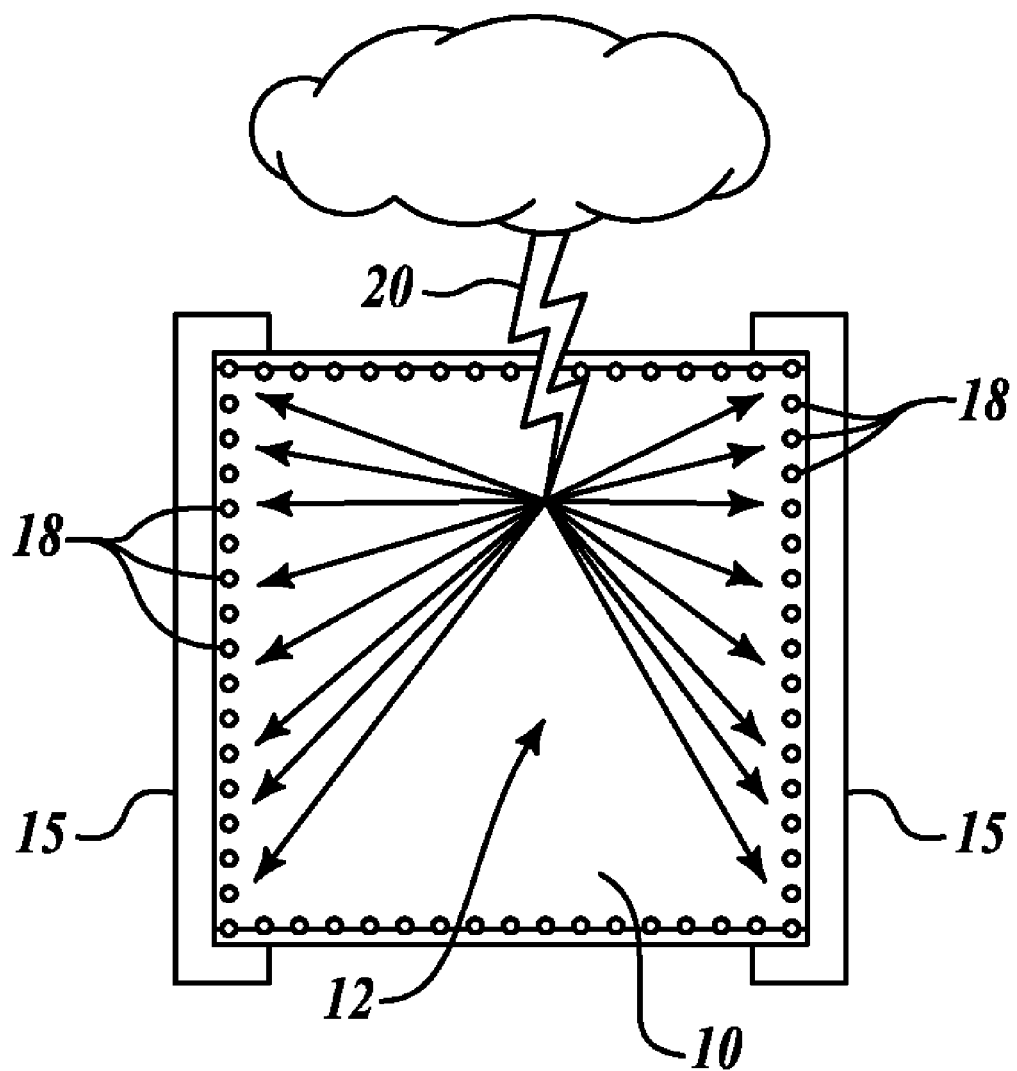
FIG. 1 is a schematic top view depicting a lightning strike on a prior art nonconductive aircraft skin panel coated with a metal liner.
Figure 2:
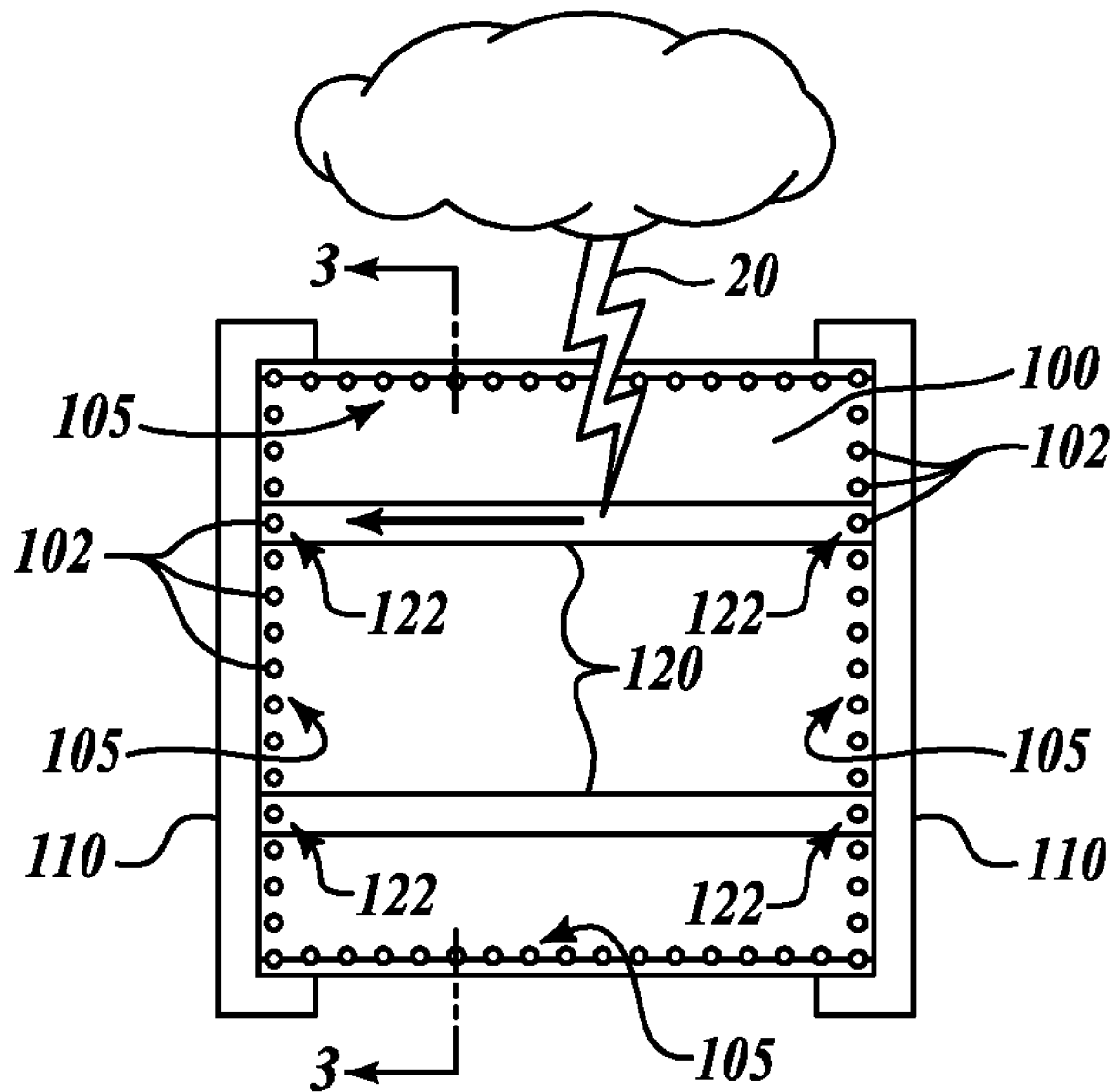
FIG. 2 is a schematic top view of an embodiment of the invention showing a nonconductive aircraft skin panel with conductive strips applied to divert lightning and dissipate lightning energy.
Figure 3:
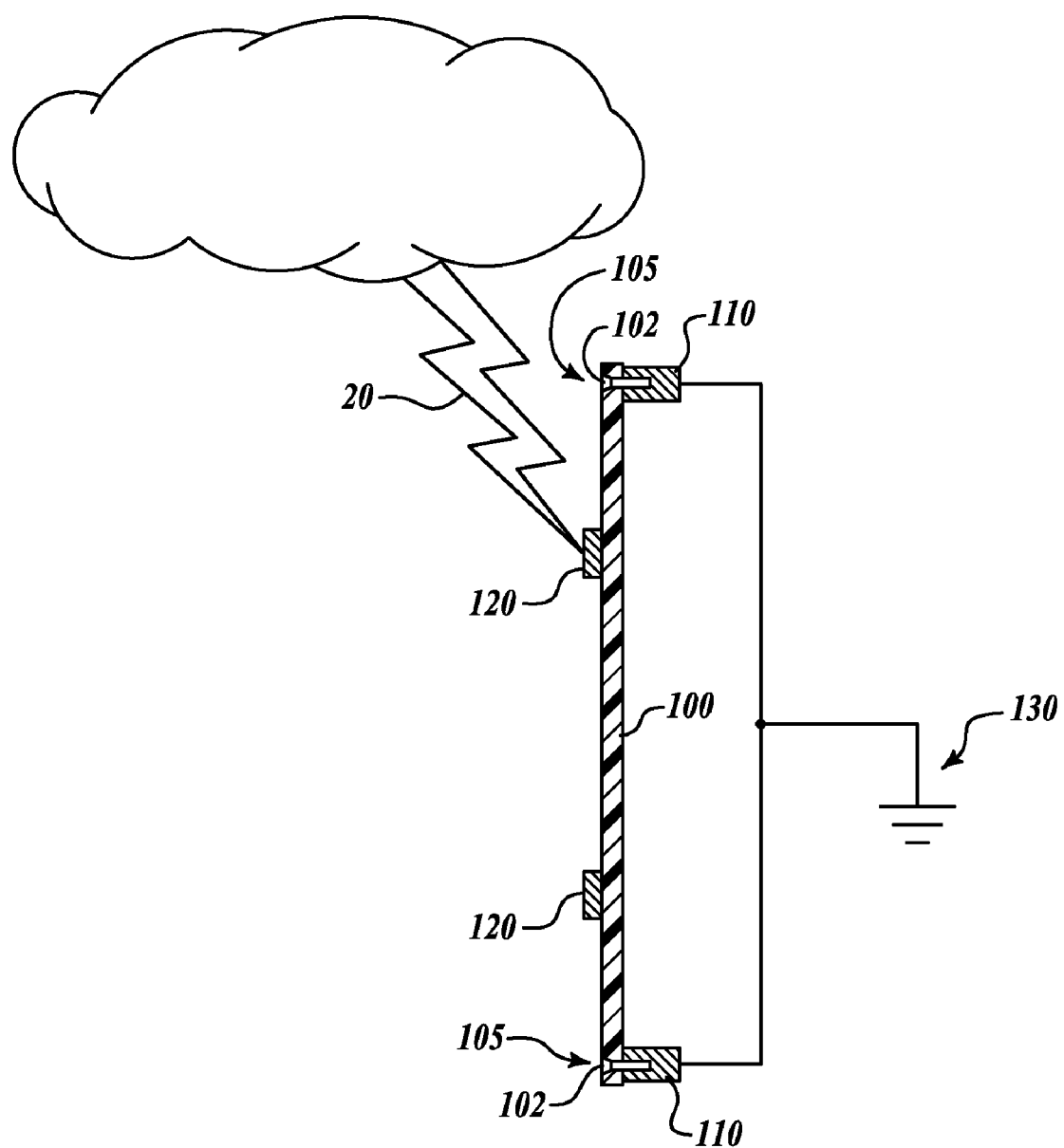
FIG. 3 is a schematic cross sectional view of the embodiment of FIG. 2.

FIGS. 2 and 3 illustrate a nonconductive panel 100, such as a fiberglass or carbon fiber composite panel, that is affixed to aircraft airframe structure 110 via a series (only two illustrated) of electrically conductive fasteners 102 (typically metal fasteners). The fasteners 102 are arrayed along the peripheral regions 105 of the skin panel 100. A series of spaced apart strips 120 are arrayed across the panel 100, with at least one end 122 of each strip 120 in contact with a fastener 102.

As shown, when a panel generates a lightning leader and lightning 20 channels to the panel 100, the lightning strikes preferentially at an electrically conductive strip 120, rather than on the nonconductive outer panel surface. The lightning energy then flows along the strip 120 (as shown by the arrow) to a fastener 102 in communication with the strip 120, and thence to the airframe structure 110 and its underlying grounding system 130.

The nonconductive panels that comprise the aircraft skin may be of any suitable composites approved for aerospace applications. For example, fiberglass, carbon fiber composite, and the like. During use, it may be expected that the skin panel will flex. Further, the panel may be subjected to heat and other conditions that may cause differential expansion between the conductive strips and the panel outer surface. Accordingly, the conductive strips must be tightly adhered to the nonconductive panel surface, regardless of the composition of the panels, to prevent separation of the strip from the panel surface or separation from the fasteners. It is important that the fasteners are always in close electrical communication with both the strips and the aircraft structure.

In order to minimize the risk of separation between the panel and the conductive strip, in one embodiment, the strips are co-cured with the panels during panel manufacture to embed the strips in the outer surface of the panel. Thus, when the nonconductive skin panels are being formed by techniques conventional to making aircraft skin panels, the electrically conductive strips are incorporated prior to the final cure and/or panel pressing so that the strips are integrally formed with the panel or embedded in the panel surface. If necessary, the conductive strips may be treated with a composition that promotes bonding to polymers employed in making the composite skin panels, such as a silane or the like. In addition, when the panels are attached to the aircraft structure, the conductive strip should make sound electrical contact with the fastener, and the fastener should have sound contact with the airframe. While it is convenient to use fasteners to make the electrical contact between the strip and the airframe, a separate electrical connector may also be used.

It is known that certain aircraft structural features are more likely to generate "lightning leaders" that attract and channel lightning to that structural feature while the aircraft is in flight. For example, wing forward edges or nose areas are more likely to generate lightning leaders. Accordingly, nonconductive wings, such as composite wings, are more vulnerable to lightning strikes at forward edges. The use of the present technology at these lightning prone areas reduces the risk of lightning damage while at the same time reducing aircraft weight by eliminating the need for full surface area protection.

Aircraft weight is further reduced by fabricating the electrically conductive strips of light-weight expanded aluminum foil, also referred to as "EAF." This is a type of aluminum foil that has been stretched to make it very thin, so that its thickness is in the range of thousandths of an inch ("mils"). In general EAF is from about 2 mil (mil=thousandths of an inch) to about 10 mil thick. The thinner the EAF, the lower the weight for a strip of a particular surface area. Accordingly, strip thickness and hence weight is limited by considerations related to normal conditions of use. However, making the strip too thin may lead to fragility in use.

The conductive strips should be appropriately sized and spaced apart to present an effective array that diverts, and dissipates lightning energy to the airframe. The array should be so effective as to minimize the risk of a lightning strike to non-conductive surfaces of the skin panel. The influence of each strip of the array may be regarded as extending for a finite distance on either side of the particular strip. Accordingly, strip spacing is a factor in an effective array. The strips should also be sufficiently wide to be able to divert the lightning energy to the aircraft structure without skin panel puncture and/or the potential for direct current attachment to underlying systems. Accordingly, in one embodiment, the series of conductive strips may be arrayed at spaced apart intervals across the outer surface of the nonconductive skin panel. In general, the strips may be about 2 inches (50 mm) or greater in width. Further, the strips may be about 10 inches (254 mm) or less apart. Further, the strips may be 10 inches (254 mm) or less from a line of fasteners. In addition to strip spacing and width, the minimum separation distance between the inner mold line (IML) of the panel, on which strips are arrayed, and any underlying aircraft systems may be an important consideration. The closer the underlying aircraft system to the inner mold line, the more likely the system will receive a direct attachment upon lightning puncture of the panel. With strips added to a non-conductive panel, the IML separation distance effectively increases. This allows designers to make use of more space beneath the panel, but with the penalty of some weight increase due to the weight of the added strips.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A system for lightning-protection of an aircraft skin panel comprising: a nonconductive skin panel substrate; and an electrically conductive system comprising a lightning diverting and dissipating array deployed at only a portion of an outer surface of the nonconductive skin panel substrate; and an electrical conductor electrically connecting the lightning diverting and dissipating array to structure of the aircraft;

wherein the lightning diverting and dissipating array is configured to increase a space available for an aircraft system beneath the nonconductive skin panel substrate by effectively increasing an inner mold line separation distance between the nonconductive skin panel substrate and the aircraft system.

2. The system of claim 1 wherein the lightning diverting and dissipating array comprises at least one metallic strip.

3. The system of claim 1, wherein the lightning diverting and dissipating array comprises a series of spaced apart metallic strips.

4. The system of claim 3, wherein each of the spaced apart metallic strips are spaced sufficiently close to adjacent metallic strips to present an array effective for diverting lightning attachment from exposed areas of the nonconductive skin panel substrate.

5. The system of claim 1, wherein the lightning diverting and dissipating array comprises a plurality of expanded aluminum foil strips.

6. The system of claim 5, wherein spacing between adjacent metallic strips is not greater than about 10 inches when the adjacent metallic strips are about 2 inches wide.

7. The system of claim 1, wherein the lightning diverting and dissipating array is embedded in the outer surface of the nonconductive skin panel substrate.

8. The system of claim 4, wherein the lightning diverting and dissipating array comprises a plurality of expanded aluminum foil strips spaced such that adjacent metallic strips are not greater than about 10 inches apart when the expanded aluminum foil strips are about 2 inches wide.

9. A system for lightning-protection of an aircraft skin panel comprising: a nonconductive skin panel substrate; an electrically conductive fastener extending through the nonconductive skin panel substrate to affix the nonconductive skin panel substrate to an airframe of the aircraft; and a conductive strip extending at an outer surface of the nonconductive skin panel substrate, the conductive strip in electrical communication with the aircraft structure though the fastener;

wherein the conductive strip is sized to divert a lightning energy to the aircraft structure without a direct current attachment to an aircraft system positioned beneath the nonconductive skin panel substrate and is configured to increase a space available for an aircraft system beneath the nonconductive skin panel substrate by effectively increasing an inner mold line separation distance between the nonconductive skin panel substrate and the aircraft system.

10. The system of claim 9, wherein the electrically conductive strip is embedded in the outer surface of the nonconductive skin panel substrate.

11. The system of claim 9, wherein the conductive strip comprises expanded aluminum foil.

12. The system of claim 9, further comprising an electrically conductive fastener in a region proximate each end of the conductive strip.

13. The system of claim 12, wherein the nonconductive skin panel substrate comprises an aircraft wing panel.

14. The system of claim 13, further comprising a plurality of spaced apart electrically conductive strips, the strips comprising expanded aluminum foil.

15. The system of claim 14, wherein the conductive strips are about 2 inches wide, and adjacent strips are about 10 inches apart.

16. A system for lightning-protection of an aircraft skin panel comprising: a nonconductive skin panel substrate; a series of electrically conductive fasteners extending through the nonconductive skin panel substrate to affix the nonconductive skin panel substrate to structure of the aircraft, the fasteners aligned along peripheral regions of the nonconductive skin panel substrate; and a plurality of spaced apart electrically conductive strips embedded in and extending along an outer surface of the nonconductive skin panel substrate, the plurality of spaced apart electrically conductive strips in electrical communication with the aircraft structure through at least one fastener located proximate each end region of each strip;

wherein the plurality of spaced apart electrically conductive strips is configured to divert a lightning energy to the aircraft structure without a direct current attachment to an aircraft system positioned beneath the nonconductive skin panel substrate and to increase a space available for an aircraft system beneath the nonconductive skin panel substrate by effectively increasing an inner mold line separation distance between the nonconductive skin panel substrate and the aircraft system.

17. The system of claim 16, wherein the electrically conductive strips comprise expanded aluminum foil.

18. The system of claim 16, wherein the nonconductive skin panel substrate comprises a cured composite material.

19. The system of claim 18, wherein the embedded electrically conductive strips were co-cured with the composite nonconductive skin panel.

20. The system of claim 19, wherein the electrically conductive strips are about 10 inches apart and about 2 inches wide.

* * * * *